United States Patent

Nakamura et al.

[11] Patent Number: 5,884,296
[45] Date of Patent: Mar. 16, 1999

[54] NETWORK AND IMAGE AREA ATTRIBUTE DISCRIMINATING DEVICE AND METHOD FOR USE WITH SAID NEURAL NETWORK

[75] Inventors: Kazuaki Nakamura; Shinji Yamamoto, both of Toyohashi; Makoto Niioka, Sagamihara; Tetsuya Itoh, Okazaki; Shinji Okamoto, Yao, all of Japan

[73] Assignee: Minolta Co., Ltd., Osaka, Japan

[21] Appl. No.: 613,319

[22] Filed: Mar. 11, 1996

[30] Foreign Application Priority Data

| Mar. 13, 1995 | [JP] | Japan | 7-052436 |
| Mar. 13, 1995 | [JP] | Japan | 7-052437 |
| Mar. 13, 1995 | [JP] | Japan | 7-052438 |
| Mar. 13, 1995 | [JP] | Japan | 7-052439 |

[51] Int. Cl.$^6$ .............................. G06F 15/18; G06K 9/62
[52] U.S. Cl. .......................... 706/20; 382/155; 382/156; 382/159; 382/160; 382/170; 382/181
[58] Field of Search ................. 395/22, 23; 382/156, 382/159, 160, 170, 181; 706/20

[56] References Cited

U.S. PATENT DOCUMENTS

| 4,965,725 | 10/1990 | Rutenberg | 395/22 |
| 5,025,282 | 6/1991 | Nakamura et al. | 395/22 |
| 5,163,111 | 11/1992 | Baji et al. | 395/22 |
| 5,214,744 | 5/1993 | Schweizer et al. | 395/22 |
| 5,251,268 | 10/1993 | Colley et al. | 382/14 |
| 5,255,342 | 10/1993 | Nitta | 395/2 |
| 5,295,227 | 3/1994 | Yokono | 395/22 |
| 5,373,566 | 12/1994 | Murdock | 382/15 |
| 5,426,745 | 6/1995 | Baji et al. | 395/22 |
| 5,491,627 | 2/1996 | Zhang et al. | 364/413.2 |
| 5,491,776 | 2/1996 | Dangi | 395/22 |
| 5,495,542 | 2/1996 | Shimomura et al. | 382/254 |
| 5,572,628 | 11/1996 | Denker et al. | 395/22 |
| 5,608,819 | 3/1997 | Ikeuchi | 382/156 |
| 5,612,700 | 3/1997 | Tucker | 342/90 |
| 5,617,484 | 4/1997 | Wada et al. | 382/172 |
| 5,644,647 | 7/1997 | Cosgrove et al. | 382/162 |
| 5,729,623 | 3/1998 | Omatu et al. | 706/20 |

FOREIGN PATENT DOCUMENTS

| 4-47470 | 2/1992 | Japan . |
| 4-105186 | 4/1992 | Japan . |
| 4-114560 | 4/1992 | Japan . |
| 5-292308 | 11/1993 | Japan . |

OTHER PUBLICATIONS

Yoshino Inoue et al; Region Segmentation for color images appling neural network; Jun. 1994.

Ikeda et al, "Segmentation of Character and Natural Image Documents with Neural Network Model for Facsimile Equipments", IEEE Advanced Technologies in ISM(IMTC), May 1994.

Sherstinsky et al, "M–Lattice: A Novel Non–Linear Dynamical System and Its Application to Halftoning", International Conference on Acoustics, Speech and Signal Processing, IEEE 1994.

Takeda et al, "High Speed Paper Currency Recognition by Neural Networks," IEEE Transactions on Neural Networks, vol. 6, No. 1, Jan. 1995.

*Primary Examiner*—George B. Davis
*Attorney, Agent, or Firm*—Burns, Doane, Swecker & Mathis, LLP

[57] ABSTRACT

A device for discriminating an attribute of an image in a block area contained in a document image includes a device for performing a Fourier transformation based on image data in the block area and for determining a spatial frequency spectrum relating to the image in the block area; and a neural network for outputting a discrimination result as to whether or not the attribute of the image in the block area is a halftone dot image based on the spatial frequency spectrum output from the Fourier transform device.

16 Claims, 12 Drawing Sheets

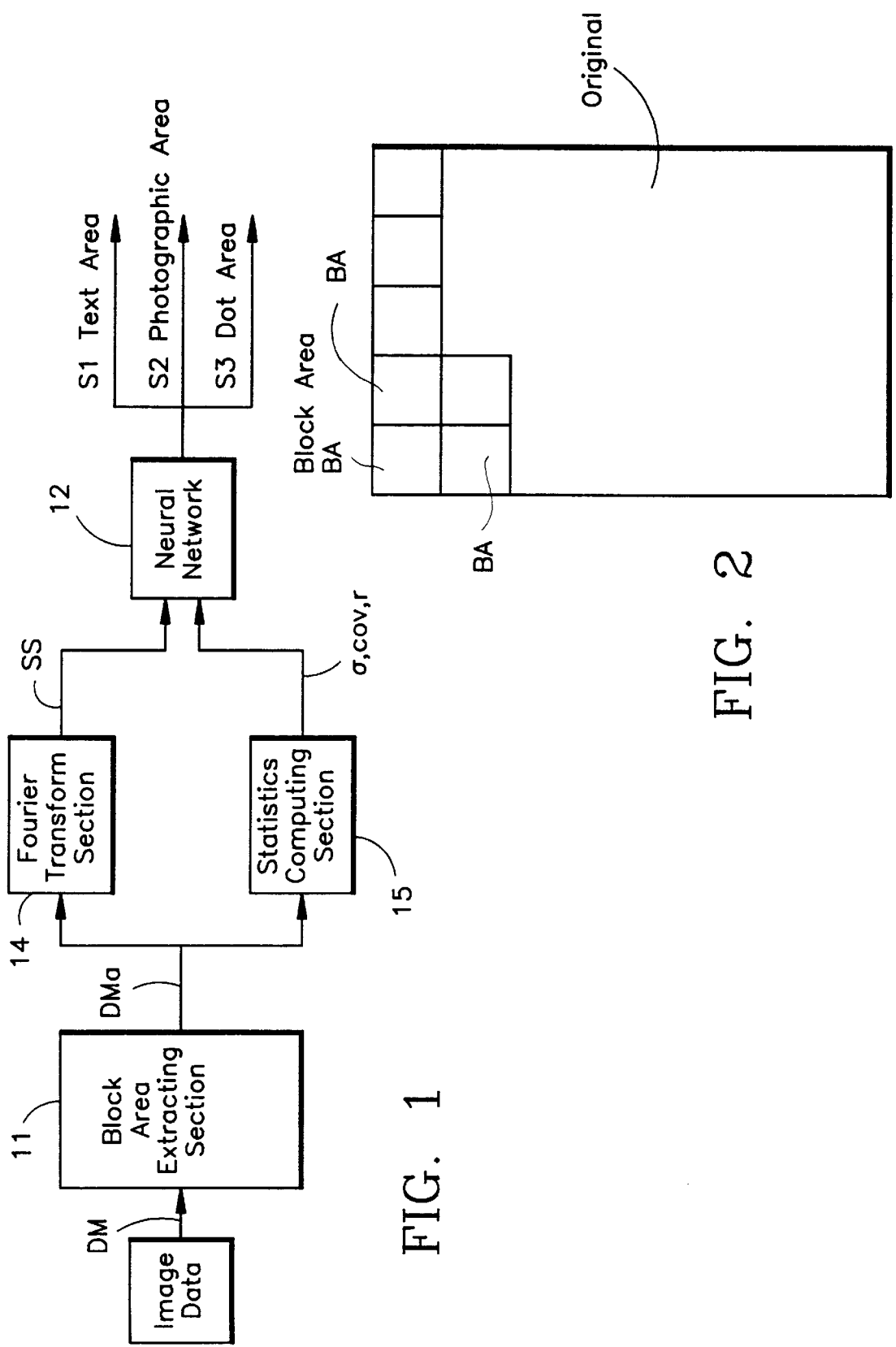

NETWORK AND IMAGE AREA ATTRIBUTE DISCRIMINATING DEVICE AND METHOD FOR USE WITH SAID NEURAL NETWORK

BACKGROUND OF THE INVENTION

1. Field of the Invention

The present invention relates to a neural network and generation method, and further relates to an image area attribute discriminating method and device for use with a neural network. This image area attribute discrimination may be used in image processing in, for example, copying machines.

2. Description of the Related Art

Neural networks accomplish information processing by learning many examples. Since neural networks are capable of high speed processing of complex information, they have been used in various fields such as image recognition, voice recognition, voice synthesis, automatic translation, and the like. An example of such uses is image area attribute discrimination.

In digital copying machines, for example, various image processes are used to improve image quality relative to multi-level digital images obtained by reading a document image. Such image processing is used for various types of documents. For example, edge enhancing processing and binarization processing are performed to sharpen text characters of text images, processing stressing halftone gradient qualities are performed on photographic images, and smoothness processing is performed on dot images to prevent moire.

There are occasions when text images, photographic images, dot images, and the like are mixed in a document. In such instances, the document image must be divided into the respective image areas. When making area divisions, a document image is divided into hypothetical minute areas (block areas), and the image data contained in each block area is sequentially extracted, and the attributes of each block area are discriminated based on the extracted image data.

Japanese Unexamined Patent Application No. HEI 4-114560 discloses a method wherein image data corresponding to block areas of 64×64 pixels are extracted from a document image, and histogram feature quantity and line density feature quantity are extracted based on the extracted image data, and said data are input to a neural network to discriminate attributes.

Inoue et al. propose a method in "Image Area Separation Methods Using Neural Networks" (Japan Simulation Society, 13th Simulation Technology Conference, June, 1994), wherein average luminance and maximum density difference are extracted as feature quantities from small areas of 8×8 pixels, and said data are input to a neural network to discriminate attributes.

The former method, however, cannot accurately discriminate whether or not an area is a halftone dot area via a neural network because when a histogram feature quantity and a line density feature quantity are input to a neural network, the information expressing periodicity of pixels is not contained in said feature quantities. Thus, a document which contains halftone dot areas pose a problem insofar as block area attributes cannot be accurately discriminated.

Furthermore, the latter method is unable to accurately discriminate whether or not an area is a halftone dot area or a photographic area even when the average luminance and maximum density difference are input to a neural network as feature quantities.

Conventionally, a single image datum, which corresponds to a single target area that is to be discriminated for attributes, is extracted, and attribute discrimination is accomplished based on said single image datum, such that discrimination errors occur in the relatedness of the actual type of image of the target area and the target area size (magnitude) and, thus, accurate discrimination cannot be accomplished.

When, for example, the target area of an image is a halftone dot area and the size of the target area is relatively small compared to the halftone period, there is the possibility that a dot image will be erroneously discriminated as a photographic image (variable density image) because information related to halftone dot periodicity is not contained in the image data. Furthermore, when the image of the target area is a text image and the text is large, and even when halftone dot lines and dots are thick in the case of dot images, there is a possibility of erroneous discrimination as a photographic image because the halftone dot features and text of the target area are not input.

Three perception levels comprising an input level, intermediate level, and output level, or improvements thereof are used as neural networks in the previously described methods. Furthermore, various feature quantities extracted from the image data of block areas are used as input signals to the neural network. That is, attribute discrimination by neural networks is conventionally accomplished by combining various feature quantities having a physical meaning.

When, however, area attributes must be discriminated in real time as in the case of copying machines, the circuitry for extracting feature quantities becomes complex and the construction of the circuits themselves becomes difficult, which presents disadvantages in terms of processing speed, flexibility, and cost. It is extremely difficult to determine threshold values for each feature quantity of a variety of documents to be copied; extensive experimentation and knowhow are required, such that a good deal of time and effort are necessary for the experiments for threshold value determination.

Speaking in general, when neural networks are used in new fields, it is often unclear what data should be input as feature quantities to accomplish discrimination by the neural network. In such instances, it is anticipated that accurate discrimination results cannot be obtained by a neural network without extensive circuitry for extracting feature quantities and a great deal of time expended to create programs.

OBJECTS AND SUMMARY

An object of the present invention is to eliminate the previously described disadvantages.

Another object of the present invention is to provide accurate discrimination of attributes relating to block areas contained in a document image, and provide accurate document area division.

Another object of the present invention is to provide a neural network capable of direct input of input signals of a discrimination object without requiring feature quantities as input signals, and a method for creating said neural network.

A further object of the present invention is to provide easy and accurate discrimination of area attributes based on input image data.

An even further object of the present invention is to provide an image area attribute discriminating device capable of greater accuracy in attribute discrimination without erroneous attribute discrimination resulting from the interrelatedness of the size of a target area and image attributes of said target area.

These and other objects are attained by a neural network comprising a first neural network having an intermediate level and constructed from an input level to said intermediate level, wherein within said neural network learning is accomplished so as to equalize input values from an input level with output values from an output level, and a second neural network connected so as to receive output from said first neural network.

The aforesaid objects are further attained by a device for discriminating the attributes of block areas contained in a document image, said image area attribute discriminating device comprising a Fourier transform means for determining the spacial frequency spectrum and accomplishing Fourier transformation based on image data in a block area, a statistics computing means for creating density matrix based on image data in a block area and determining statistics therefrom, and a neural network for outputting discrimination results as to whether or not block area attributes are a text area, or photographic area, or halftone dot area based on statistics output from said statistics computing means and the spatial frequency spectrum output from said Fourier transform means.

The aforesaid objects are further attained by an image attribute discrimination method which teaches a constant mapping to a neural network comprising an input level, intermediate level, and output level, extracts a first neural network created from the input level to the intermediate level within said taught neural network, combines output from said extracted neural network and inputs said data to the input level of a second neural network used for attribute discrimination, and discriminates specific area attributes from among those output from said second neural network obtained by via input of image data of a specific area at the input level of said first neural network.

The aforesaid objects are further attained by an attribute discriminating device having an extracting means for extracting various image data in a plurality of block areas having mutually different sizes relative to a target area for which attributes are to be discriminated within a document image, and a neural network for discriminating the attributes of a target area based on said extracted image data.

The above-mentioned purposes, and other purposes of this invention are clearly described in the following description accompanied by the drawings.

BRIEF DESCRIPTION OF THE DRAWINGS

These and other objects and features of the present invention will become apparent from the following description of the preferred embodiments thereof taken in conjunction with the accompanying drawings, in which:

FIG. 1 is a block diagram showing the construction of the attribute discriminating device of a first embodiment of the invention;

FIG. 2 is an illustration showing block areas;

In the following description, like parts are designated by like reference numbers throughout the several drawings.

DETAILED DESCRIPTION OF THE PREFERRED EMBODIMENTS

A first embodiment of the present invention is described hereinafter.

Figure 3:
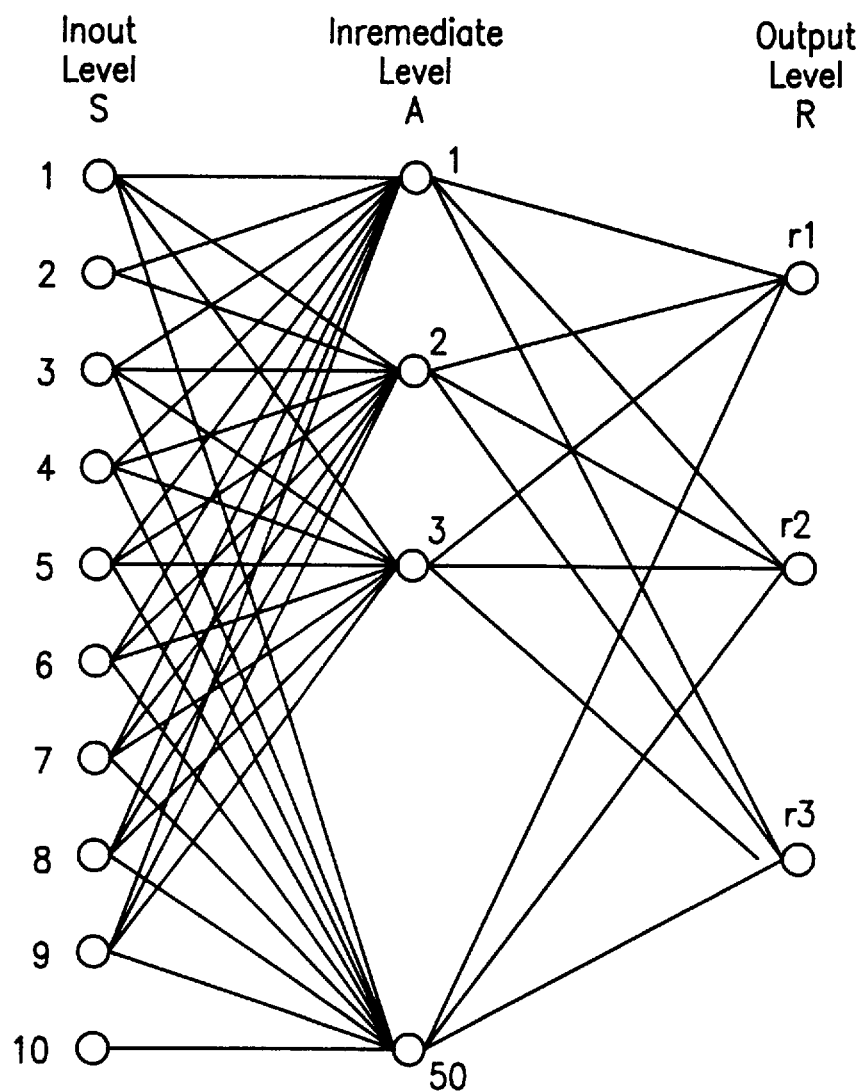
FIG. 3 is an illustration showing the construction of a neural network.

FIG. 1 is a block diagram showing the construction of an attribute discriminating device of a first embodiment of the invention. FIG. 2 illustrates a document block area BA, and FIG. 3 shows the construction of the neural network 12 of FIG. 1.

The attribute discriminating device is incorporated in, for example, a digital type copying apparatus not shown in the illustration. The image reader section of the copying apparatus reads a document set on a document platen at a predetermined resolution and predetermined halftone level to obtain multi-level image data DM. The image reader section is provided with a line sensor which has a reading density of 400 dots-per-inch (dpi), and which scans a document in a vertical direction (subscan direction) to obtain image data DM of 256 halftone shades. The attribute discriminating device discriminates attributes AT of block area BA, which is a small region contained in the document image.

The attribute discriminating device comprises a block area extracting section 11, Fourier Transform section 14, statistics computing section 15, and neural network 12.

The block area extracting section 11 extracts image data DMa corresponding to block are BA from the input image data DM. Block areas BA are square shaped areas of 16×16 pixels and are allocated so as to prevent mutual overlap, as shown in FIG. 2. Image data DM of one line or a plurality of lines are input to block area extracting section 11, such that image data DMa corresponding to block area BA can be extracted by storing the input image data DM in a suitable memory space corresponding to the pixel address.

Fourier transform section 14 determines the spatial frequency spectrum SS by a high-speed Fourier transformation (FFT) based on the 16×16 pixel image data DMa extracted by block area extracting section 11. The Fourier transform section 14 executes a high-speed Fourier transformation 16 times for each line of the 16×16 pixel image data DMa. A spatial frequency spectrum expressing eight types of frequencies are obtained by a single high-speed Fourier transform. Average value data of zero frequency are omitted from the aforesaid data to obtain seven data of real part absolute values of the other frequencies. The data of 16 Fourier transforms are added to each frequency to obtain seven individual data. These data are the spatial frequency spectrum SS obtained by the Fourier transform section 14. The spatial frequency spectrum SS normalizes the maximum value of said absolute values as [1], and outputs said data as seven dimension vector data to the neural network.

Statistics computing section 15 calculates a density matrix based on the 16×16 pixel image data DMa extracted by the block area extraction section 11, and calculates the three statistics of dispersion σ, codispersion cov, and correlation coefficient r based on said density matrix.

The density matrix expresses the relationship between the density value of a given point (x,y), and the density value of a point (x+dx,y+dy) at a distance δ [where δ=(dx,dy)] from said point (x,y). When the density value of point (x,y) is designated f(x,y), the density value of point (x+dx,y+dy) is expressed as f(x+dx,y+dy). When f(x,y)=i, the density matrix is expressed as f(x+dx,y+dy)=j, i.e., probability Pδ0(i,j).

When the image data DMa includes 256 halftone shades, the density value of each pixel has a range of 0–256, such that the density matrix comprises 256 lines by 256 rows. For example, when, within block area BA there are pixels having a density of [3] and at a distance δ therefrom there are four individual pixels having densities of [2], a value of [4] is entered in the (3,2) element of the density matrix. Similarly, when a pixel has a density value of [230] and at a distance δ therefrom there are five individual pixels having densities of [232], a value of [5] is entered in the (230,232) element of the density matrix. When, in the density matrix, there is only slight density change between adjacent pixels in a photographic image, the values of elements on a diagonal line of the matrix become large. Furthermore, when there is a large density difference including portions of high density and portions of low density as in the case of the edge portion of text images, the values of elements at the four corners of the matrix become large.

The dispersion σ, codispersion cov, and correlation coefficient r are calculated by equations (1)~(3) in statistics computing section 15.

$$\sigma x^2 = \frac{\sum_{i=0}^{R} \sum_{j=0}^{R} k^2 \cdot P\delta(i,j)}{N} - \mu x^2 \quad \quad (1)$$

$$\sigma y^2 = \frac{\sum_{i=0}^{R} \sum_{j=0}^{R} j^2 \cdot P\delta(i,j)}{N} - \mu y^2$$

$$cov = \frac{\sum_{i=0}^{R} \sum_{j=0}^{R} i \cdot j \cdot P\delta(i,j)}{N} - \mu x \cdot \mu y \quad \quad (2)$$

$$r = cov/(\sigma x \sigma y) \quad \quad (3)$$

The value R is the upper limit of the density value. The values μx, μy are mean values calculated by equations (4) and (5); the value N is expressed by equation (6).

$$\mu x = \frac{\sum_{i=0}^{R} i \sum_{j=0}^{R} P\delta(i,j)}{N} \quad \quad (4)$$

$$\mu y = \frac{\sum_{j=0}^{R} j \sum_{j=0}^{R} P\delta(i,j)}{N} \quad \quad (5)$$

$$N = \sum_{i=0}^{R} \sum_{j=0}^{R} P\delta(i,j) \quad \quad (6)$$

In the present embodiment, N=16×16, and R=255.

Figure 4:
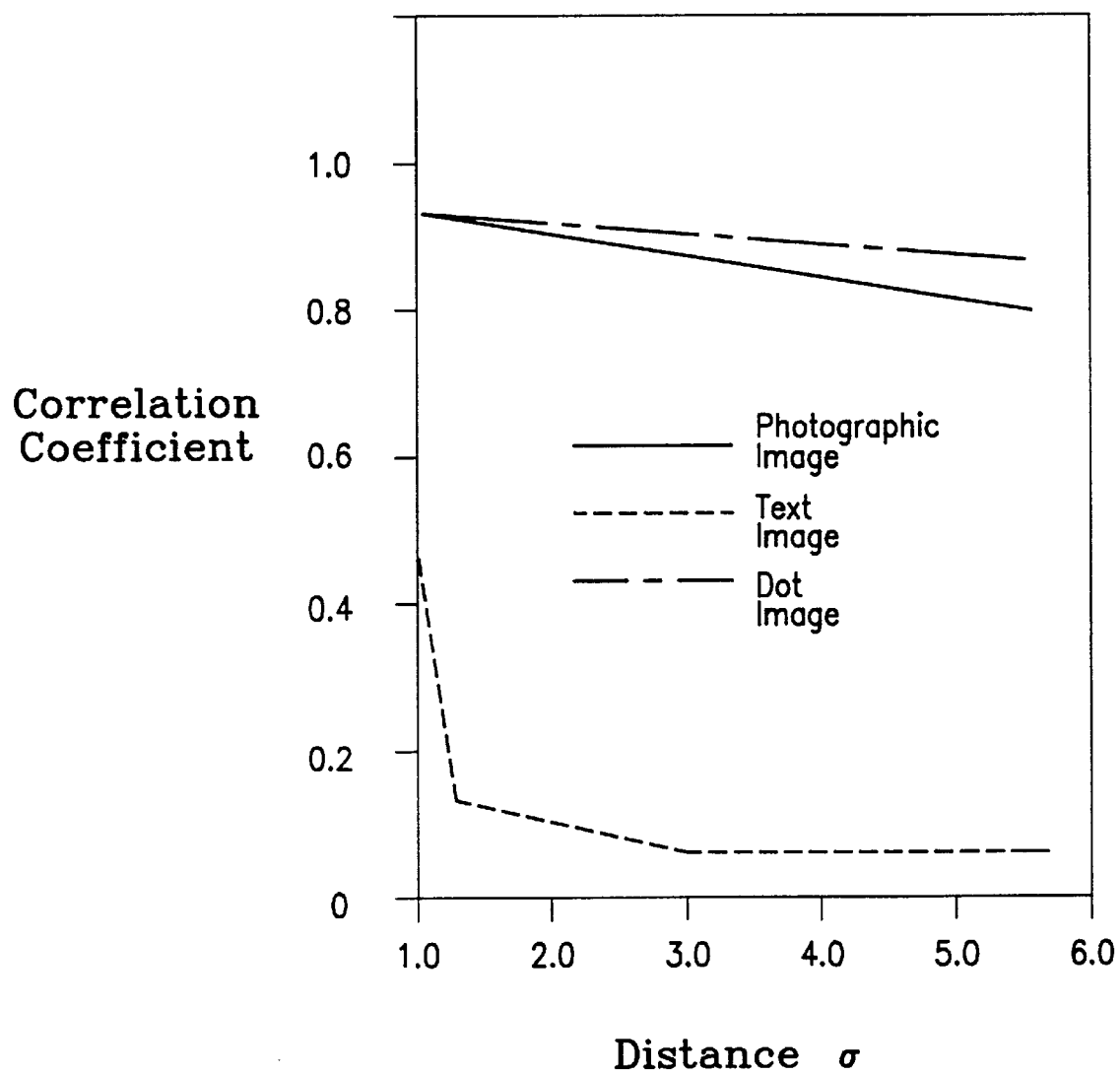
FIG. 4 shows the correlation coefficients of each image type.

FIG. 4 illustrates the correlation coefficients r of text images, photographic images, and dot images.

The correlation coefficient r is [1] when data are only on a diagonal line of the density matrix, and approaches [0] as the data depart from the diagonal line. In photographic images, the correlation coefficient r approaches [1] because the data are concentrated on the diagonal line of the density matrix in photographic images. In text images, the correlation coefficient r approaches [0] because the data are concentrated at the four corners of the matrix in text images. These are shown in FIG. 4.

In the first embodiment, the distance δ=(1,0), and dispersion σ is divided by 4,000, and as a result, data exceeding [1] are normalized as [1], and thereafter the three statistics σ, cov, and r are output to the neural network 12.

Neural network 12 discriminates whether or not the attributes AT of block area BA are text image, photographic image, or halftone dot image based on the spatial frequency spectrum SS output from the Fourier transform section 14, and the statistics σ, cov, and r output from statistics computing section 15.

As shown in FIG. 3, neural network 12 comprises three levels including an input level S, intermediate level A, and output level R, and the number of neurons of each level are 10, 50, and 3, respectively. The number of neurons of intermediate level A may a number other than 50. Seven data from the previously mentioned Fourier transform section 14, and three data from statistics computing section 15 are input linearly to input level S. Input level S linearly transmits the input data directly to intermediate level A. Input level S, intermediate level A, and output level R are connected by coupling coefficients w. The values of these coupling coefficients w are changed by learning. The response functions of intermediate level A and output level R are sigmoid functions.

Output corresponding to text areas, photographic areas, and halftone dot areas are obtained from the three neurons r1~r3 of the output level R. That is, the neural network 12 discriminates the attributes AT of the block area BA based on the data input to the input level S, and the output S1 of neuron r1 approaches [1] in the case of a text area, the output S2 of neuron r2 approaches [1] in the case of a photographic area, and the output S3 of neuron r3 approaches [1] in the case of a halftone dot area.

Neural network 12 learns by the well-known art of the back propagation method. In this learning, samples are created of the text image, photographic image, and dot image, and the image data thus obtained are input to an attribute discriminating device as sample data. Learning occurs until the sample data fall below the threshold of the mean squared error MSE of the teaching data of attribute AT.

The attributes AT of the block area BA are determined based on the output S1-S3 from neural network 12. For example, when a given single output is [1], the area is determined to have an attribute corresponding to said output. When the output exceeds a certain threshold, the area is determined to have an attribute corresponding to said output.

An area corresponding to a maximum output is determined to have an attribute corresponding to that output.

Smoothing is accomplished based on the attributes AT of each block area BA determined as described above, and the discrimination result of each block area BA is corrected thereby. Discrimination errors are reduced by discriminating each area as an area larger than the block area BA. Thus, the document image is divided into three types of areas, i.e., text areas, photographic areas, and halftone dot areas.

An edge enhancing process and a binarization process are executed on the text areas, a process for obtaining natural tones or process for enhancing specific tones is executed on the photographic areas, and a smoothing process is executed on the halftone dot areas to prevent moire.

Photographic images are variable density images having a suitably large pixel density relative to the read density of the document image, as in silver salt photographs. Dot images have fewer differences relative to photographic images as the halftone dots become finer. For example, when the read density of document PM is 400 dpi, the density of the dot image is 200 lines/inch and the read image data DM are similar to those of photographic image. Accordingly, in this case a dot image of 200 lines/inch or greater may be included in the photographic image category.

According to the first embodiment, the spatial frequency spectrum SS output from the Fourier transform section 14 contains information expressing pixel periodicity, which can be input to the neural network 12 and used to accurately discriminate whether or not an area is a halftone dot area. The statistics $\sigma$, cov, and r output from statistics computing section 15 contain feature information of text images and photographic images, which is used to accurately discriminate whether or not an area is a text area or a photographic area. Accordingly, the attributes AT of a block area BA contained in a document image PM can be accurately discriminated by the attribute discriminating device.

In particular, since the spatial frequency spectrum SS output from the Fourier transform means 14 contains information expressing pixel periodicity, the spectrum SS can be input to the neural network 12 to accurately discriminate whether or not an area is a halftone dot area. Furthermore, since the statistics output from the statistics computing means 15 contain feature information of text images and photographic images, the information can be used to accurately discriminate whether or not an area is a text area or a photographic area.

Although dispersion $\sigma$, codispersion cov, and correlation coefficient r are used as statistics obtained from the density matrix, other statistical values alternatively may be used. For example, the angular secondary moment, contrast, entropy and the like may be used. Although three types of attribute discrimination, i.e., text area, photographic area, and halftone dot area, are used herein, two or less types, or four or more types of attribute discriminates alternatively may be used.

A second embodiment of the invention is described hereinafter.

Figure 5:
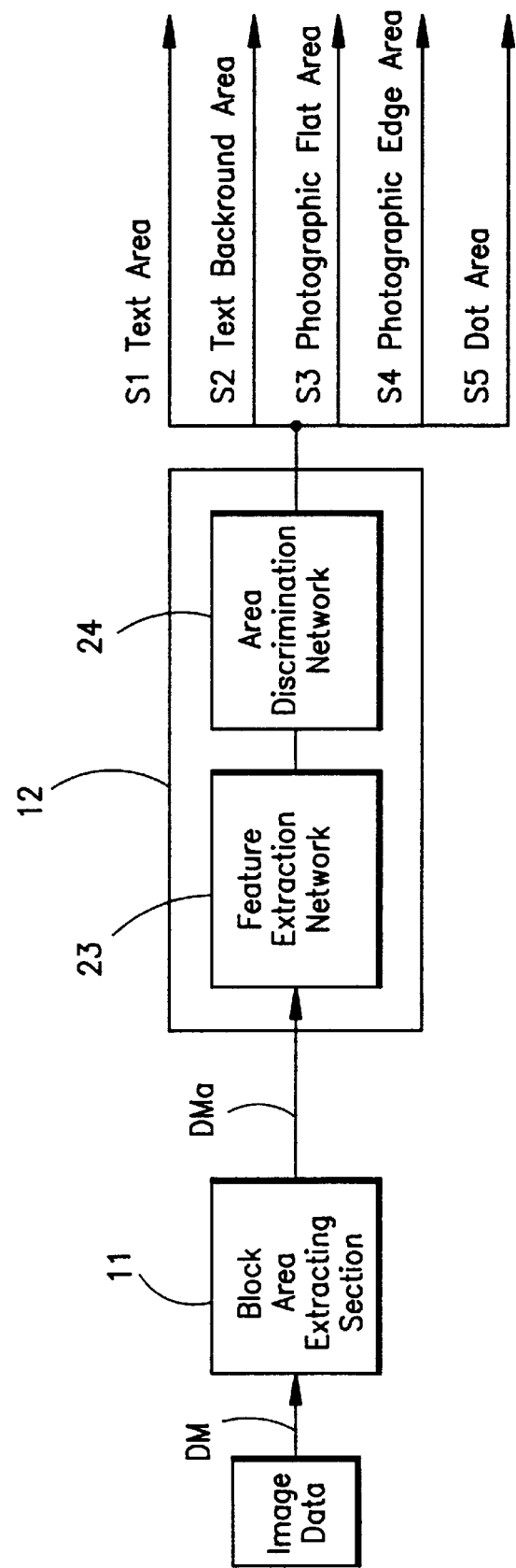
FIG. 5 is a block diagram showing the construction of an attribute discriminating device of a second embodiment of the invention.
Figure 6:
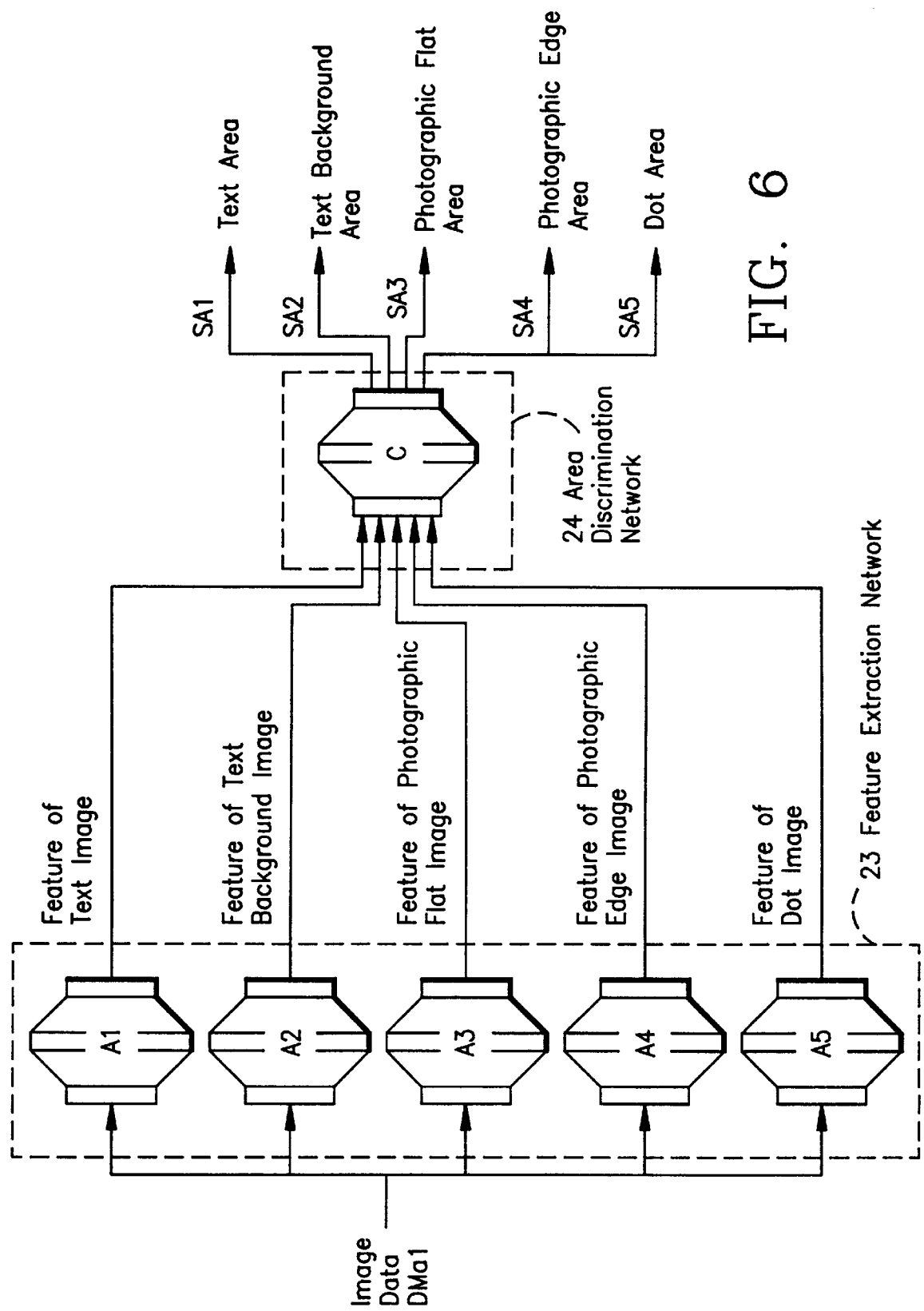
FIG. 6 shows the construction of a neural network used for block discrimination.
Figure 7:
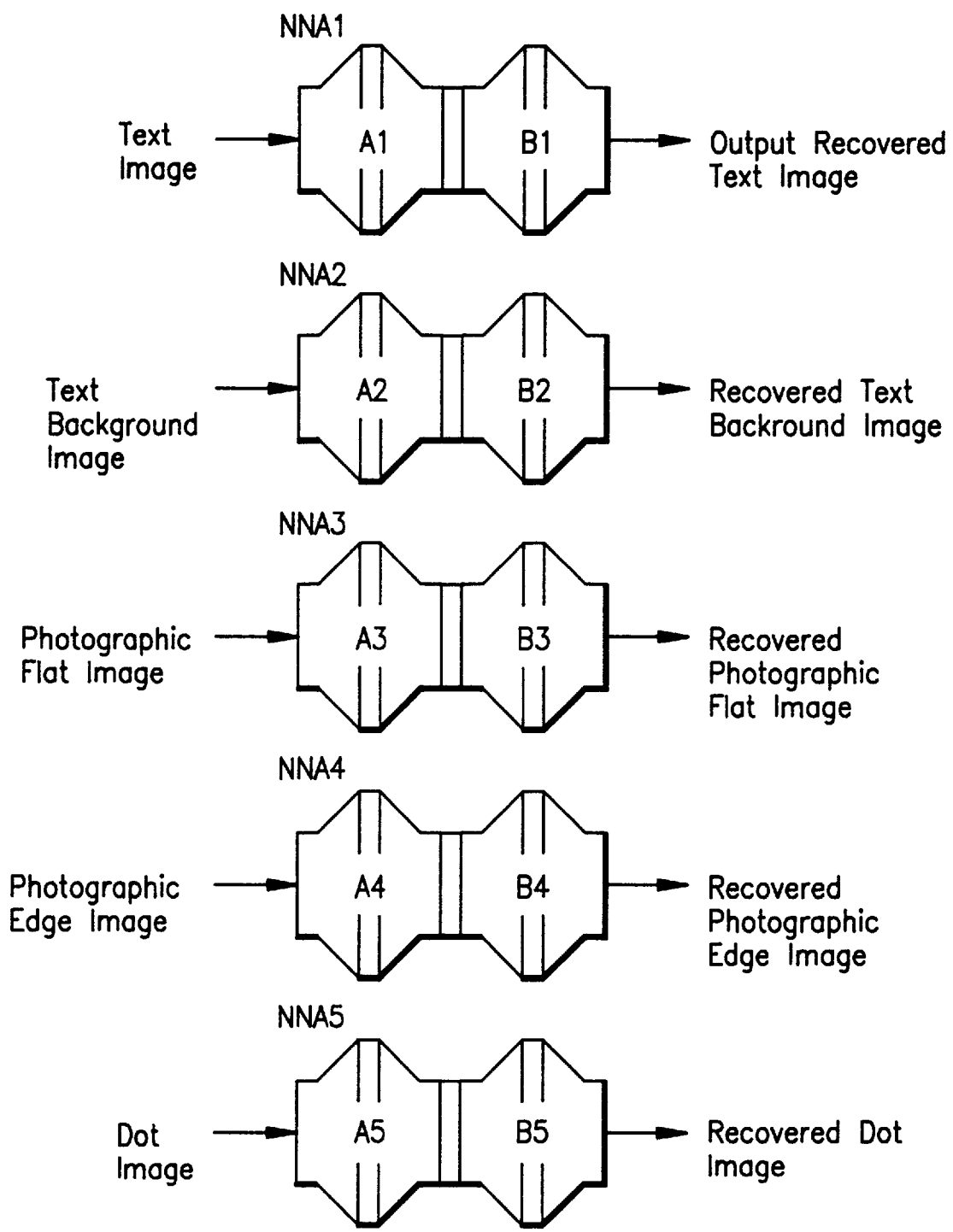
FIG. 7 shows the creation process of the feature extraction network.
Figure 8:
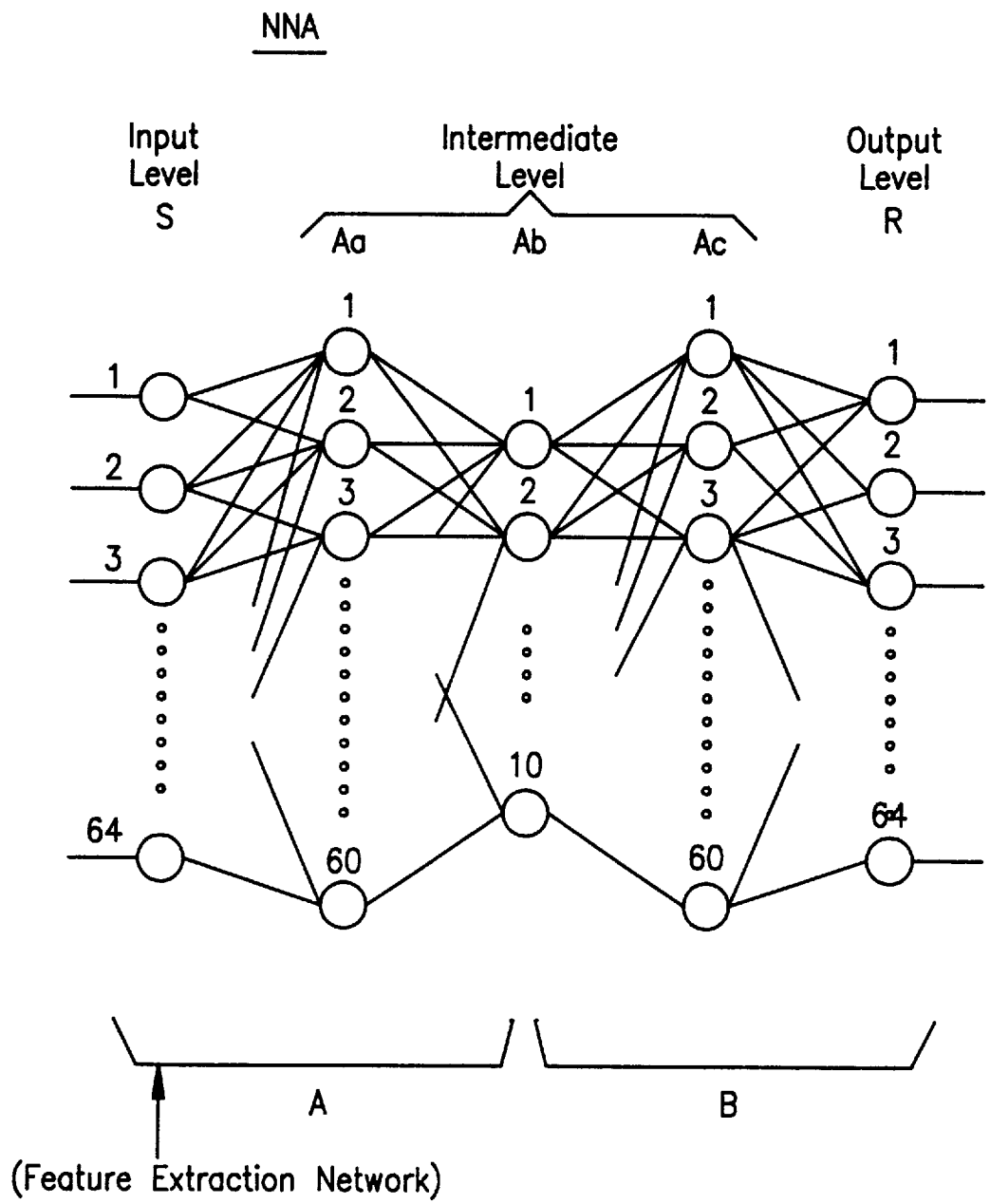
FIG. 8 shows an example of an hourglass type neural network.
Figure 9:
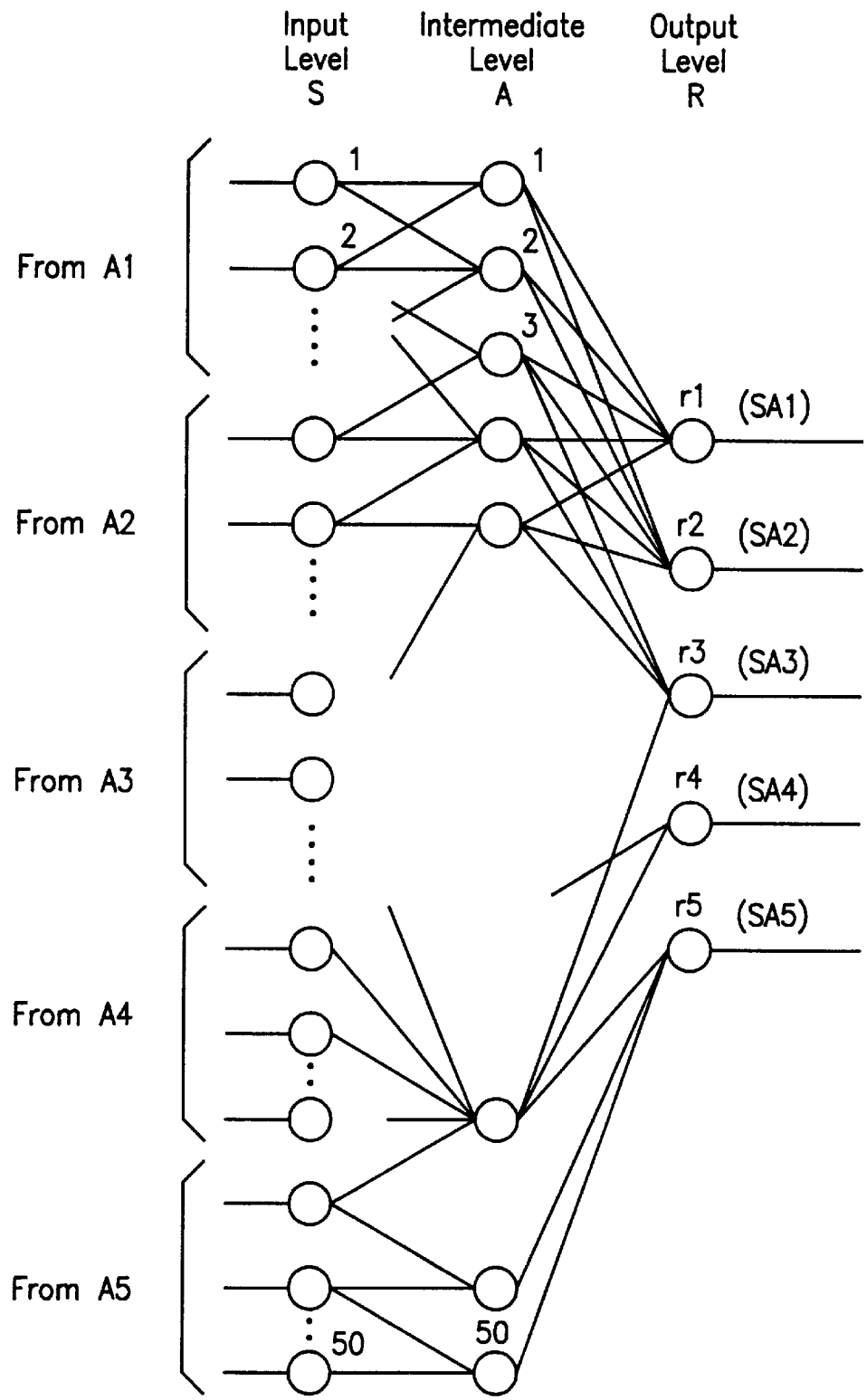
FIG. 9 shows an example of an area discrimination network.
Figure 10:
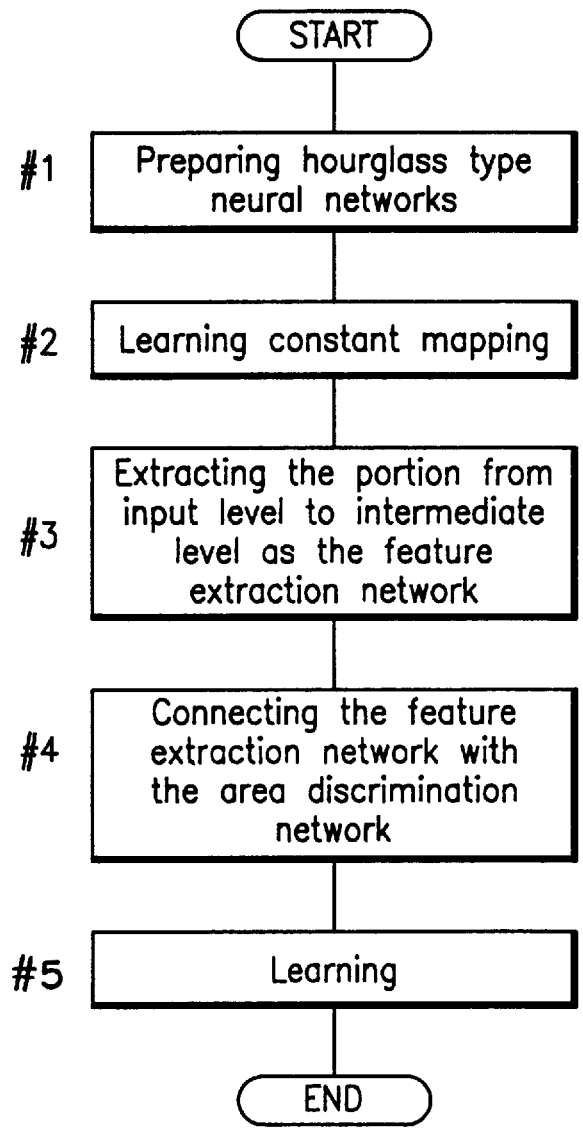
FIG. 10 is a flow chart showing the neural network creation method.

FIG. 5 is a block diagram showing the construction of an attribute discriminating device of a second embodiment, FIG. 6 shows the construction of a neural network 12, FIG. 7 shows the creation process of network 23 used for feature extraction, FIG. 8 shows a special neural network NNA of the hourglass type, FIG. 9 shows a network 24 used for area discrimination, and FIG. 10 is a flow chart showing the method for creating the neural network 12.

The attribute discriminating device of FIG. 5 may be incorporated in a digital copying apparatus just as in the first embodiment, and discriminates attributes AT of block area BA, i.e., a small area contained in a document image.

As shown in FIG. 5, the attribute discriminating device mainly comprises a block area extracting section 11, and a neural network 12.

The block area extracting section 11 extracts image data DMa corresponding to the block area BA relative to the input image data DM. The block area extracting section 11 extracts image data DMa corresponding to block area BA from the input image data DM. Block areas BA are square shaped areas of 8×8 pixels, and are allocated so as to prevent mutual overlap, as in the first embodiment shown in FIG. 2. Image data DM of one line or a plurality of lines are input to the block area extracting section 11, such that image data DMa corresponding to a block area BA can be extracted by storing the input image data DM in suitable memory space corresponding to the pixel address.

As shown in FIG. 6, the neural network 12 discriminates whether or not the attribute BA of each block area BA is text, text background, photographic flat, photographic edge, or halftone dot, and outputs the result. The neural network 12 comprises a feature extraction network 23 and an area discrimination network 24.

An advantage of the present construction is that read image data are input directly to the feature extracting neural network for comprehensive determination as text or photograph, without discriminating attributes after special preprocessing of read image data (e.g., spatial frequency spectrum and density extraction processes). The read image data includes data after noise elimination such as shading correction and the like.

The neural network 12 creation method is described hereinafter with reference to FIG. 10. First, however, the feature extraction network 23 creation method is described. As shown in FIG. 7, five individual first neural networks (NNA1~5) are prepared (step #1). As shown in FIG. 8 each neural network NNA is an hourglass type neural network of five levels, and the number of neurons are, in order from the first level (input level) to fifth level (output level), 64, 60, 10, 60, 64, respectively. Each neural network NNA is constructed such that the third level (intermediate level) has a fewer number of neurons than the input level, and the input level and output level have identical numbers of neurons. That is, the third level is the center level, while the levels on either side of the third level are symmetrical.

In the neural network NNA, the response functions of the input level S, the intermediate level (third level) Ab, and the output level R are linear functions, and the response functions of the intermediate level (second level) Aa and intermediate level (fourth level) Ac are sigmoid functions. The portions from the first level to the third level are networks A1~A5 used as feature extracting sensors, and the portions of the fourth and fifth levels are networks B1~B5.

The aforesaid neural networks NNA learn the constant mapping when input signals having a distribution of the aforesaid specific characteristics are input to the input level (step #2).

That is, a learning text image is input to the input level S of the first neural network NNA1, and the image is learned such that an image (recovered text image) similar to the input image is output from the output level R. In this case, the output value from each output level corresponding to each input level is equal to the input value of the respective input levels.

A learning text background image is input to the level S of the second neural network NNA2, and the image is learned such that an image (recovered text background image) similar to the input image is output from the output level R.

A learning photographic flat image is input to the input level S of the third neural network NNA3, and the image is learned such that an image (recovered photographic flat image) similar to the input image is output from the output level R.

A learning photographic edge image is input to the input level S of the fourth neural network NNA4, and the image is learned such that an image (recovered photographic edge image) similar to the input image is output from the output level R.

A learning dot image is input to the input level S of the fifth neural network NNA5, and the image is learned such that an image (recovered dot image) similar to the input image is output from the output level R.

The learning accomplished by the neural networks NNA is accomplished by the well known back propagation method. In learning, a plurality of samples of text images, text background images, photographic flat images, photographic edge images, and dot images are created, and 8×8 pixel image data obtained from said various samples are input to input level S as sample data. Learning is accomplished in the various neural networks NNA so as to minimize the mean squared error relative to the overall sample.

By means of the aforesaid learning, each neural network NNA extracts features from the respective intermediate level Ab so as to express the qualities of each image, i.e., images similar to text images, images similar to text background images, images similar to photographic flat images, images similar to photographic edge images, and images similar to dot images. That is, features of each image are obtained by the learning accomplished by the neural networks NNA. The features in this instance are not features having clear meaning in a physical sense. Each intermediate level Ab has a fewer number of neurons than each input level S. Therefore, the feature information input to input level S may be compressed or summarized when placed in intermediate level Ab.

Intermediate level feature acquisition in neural networks is discussed by Irie et al., in the article "Internal Expression Acquisition by Multi-Level Perceptron" (Journal of the Electronic Information Communication Society of Japan; Vol. J73-D-II, No.8, pp.1173~8, August, 1990).

The learned portions (networks A1~5) from each of the first levels to the third levels of the neural networks NNA1~5 that are extracted comprise the feature extraction network 23 (step #3). In the feature extraction network 23, each autologous input level S of each network A1~5 is connected in parallel, and 64 (8×8) individual image data are input simultaneously to networks A1~5. The values output from the output level of networks A1~5 are 50 (10×5) individual data.

As shown in FIG. 9, the area discrimination network 24 has three levels, and the number of neurons of each level, i.e., input level S, intermediate level A, and output level R, is 50, 50, and 5, respectively. The response function of input level S is a linear function, the response functions of intermediate level A and output level R are sigmoid functions. The output of feature extracting network 23 is connected to the input level S of area discrimination network 24 (step #4).

Input signals having distribution features identical to those learned by neural networks NNA are input to the neural network 12 having the previously described construction, and the area discrimination network 24 learns without changing the coupling coefficients of the feature extracting network 23 (step #5).

That is, in the neural network 12, first a learning text image is input and learned so as to set [1] as the output of neuron r1 of output level R of the area discrimination network 23. Then, a learning text background image is input and learned to set [1] as the output of neuron r2 of the area discrimination network 24. Finally, a learning photographic flat image, a photographic edge image, and a dot image are input and learned sequentially to set [1] as the output of neurons r3, r4, and r5 of the area discrimination network 24. In this learning process, the coupling coefficients of the area discrimination network 12 are changed.

The learning accomplished by the neural network 12 is accomplished by the well known back propagation method. Samples used for learning may be identical to or different from the samples used for learning by the neural networks NNA. Text images, text background images, photographic flat images, photographic edge images, and dot images are learned so as to the minimize mean squared error.

Thus, the neural network 12 is created. When image data DMa are input to the created neural network 12, output S1~5 corresponding to text area, text background area, photographic flat area, photographic edge area, and halftone dot area are obtained from the five neurons r1~5 of each output level R. That is, the neural network 12 discriminates attributes AT of the block area BA based on the data input to the input levels S of the networks A1~5. The output S1 of neuron r1 approaches [1] when the area is a text area; the output S2 approaches [1] when the area is a text background area; the output S3 approaches [1] when the area is a photographic flat area; the output S4 approaches [1] when the area is a photographic edge area; and the output S5 approaches [1] when the area is a halftone dot area.

The attribute AT of the block area BA is determined based on the output S1~5 from the neural network 12. For example, when a given single output is [1], the area corresponding to the output is determined. Furthermore, when a single output exceeds a given threshold value, the area corresponding to the output is determined. An area corresponding to a maximum output is determined to be the area.

Smoothing is accomplished by morphology and the like based on the attribute AT of each block area BA determined as described above, thereby correcting the discrimination result of each block area BA. That is, discrimination errors are reduced by discriminating each area as an area larger than block area BA. Therefore, document image PM is divided into five areas comprising a text area, text background area, photographic flat area, photographic edge area, and halftone dot area.

Text areas are subjected to, for example, edge enhancement processing and binarization, whereas photographic flat areas and photographic edge areas are subjected to processing to achieve natural halftones or processing to enhance specific halftones, and whereas dot images are subjected to smoothing to prevent moire.

Photographic images are variable density images having a suitably large pixel density relative to the read density of the document image, as in silver salt photographs. Photographic flat images have portions of slight density variation, and photographic edge images have portions of large density variation. Photographic flat images are distinguished from the white background portion of text images. For example, the text background images are subjected to a whitening process, whereas the photographic flat image is subjected to a halftone enhancing process. Dot images have fewer differences relative to photographic images as the halftone dots become finer. For example, when the read density of document PM is 400 dpi, the density of the dot image is 200 lines/inch and the read image data DM are similar to those of photographic image. Accordingly, in this case a dot image of 200 lines/inch or greater may be included in the photographic image category.

Although an 8×8 pixel square area is used as block area BA in the second embodiment, various sizes of areas, such as 4×4 pixel, 3×3 pixel, 16×16 pixel, and 64×64 pixel, may be used as block area BA. Furthermore, the area need not be square in shape. Although block areas BA are preferably allocated so as to prevent mutual overlap, block areas may be allocated in a sequential shift of importance.

Figure 11A:
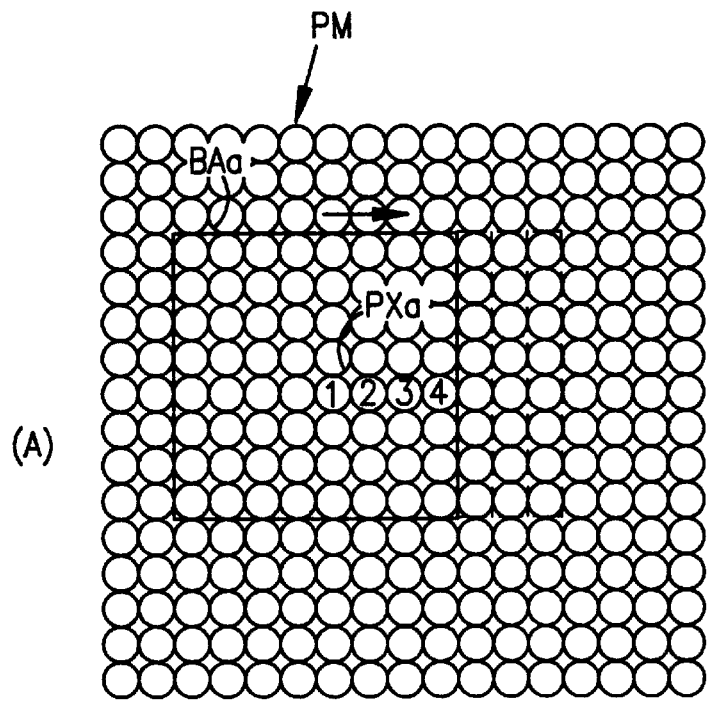
FIGS. 11(A) and 11(B) illustrate the allocation method of other block areas.

As shown in FIG. 11(A), image data of block area BAa of an 8×8 pixel region bordering a single pixel PXa to be subjected to attribute discrimination in document image PM, can be extracted as image data DMa corresponding to said pixel PXa, and block area BA can be sequentially shifted one pixel at a time.

Figure 11B:
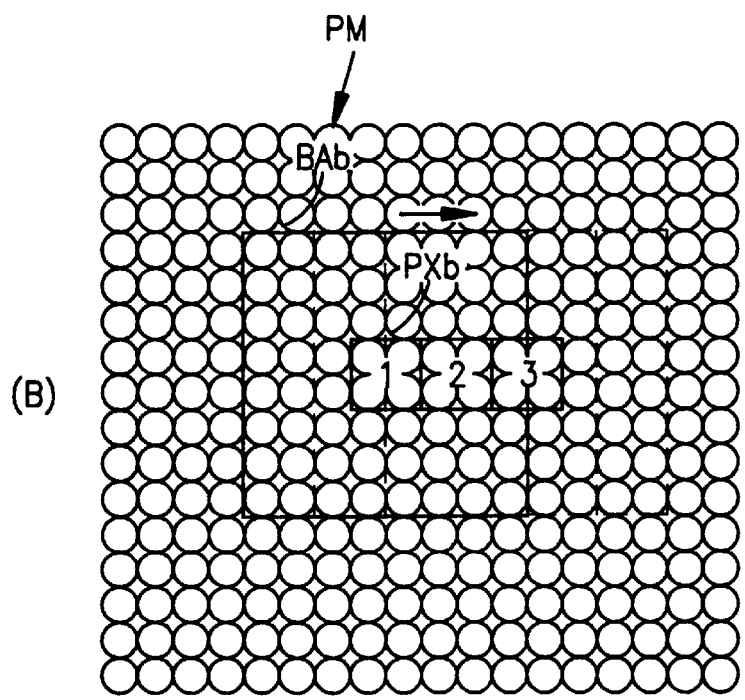

As shown in FIG. 11(B), image data of block area BAb of an 8×8 pixel region bordering four individual (2×2) pixels PXb to be subjected to attribute discrimination, can be extracted as image data DMa corresponding to said pixel PXb, and block area BAb can be shifted two pixels at a time.

Changes in the block area allocation may be suitably made in the first embodiment also.

As can be readily understood from the examples above, in the first and second embodiments, an optional number of pixels may be clustered as a block area. Image data extracted by the block area extracting means need not necessarily be image data of only pixels contained in the block area or the entire pixel region, inasmuch as, for example, image data of pixels in the border area of the block area may be included. In this case, image data of mutually adjacent pixels are unnecessary, and image data of suitable individual pixels may be extracted in a nonsequential dispersion from the border area, or representative image data may be used such as mean value, maximum value, and minimum value of each small block extracted in a nonsequential dispersion of pixels in a border area.

A third embodiment of the invention is described hereinafter. The third embodiment differs from the second embodiment in the following respects. In the third embodiment, target area attributes are respectively discriminated from image data of a plurality of block areas of mutually dissimilar sizes including the target area, and thereafter, using said respective discrimination results for comprehensive discrimination of attributes of the target area.

Other than in the aforesaid points of departure, the third embodiment is identical to the second embodiment, and, therefore, discussion of similar aspects are omitted from the following description which pertains only to the aforesaid points of dissimilarity.

Figure 12:
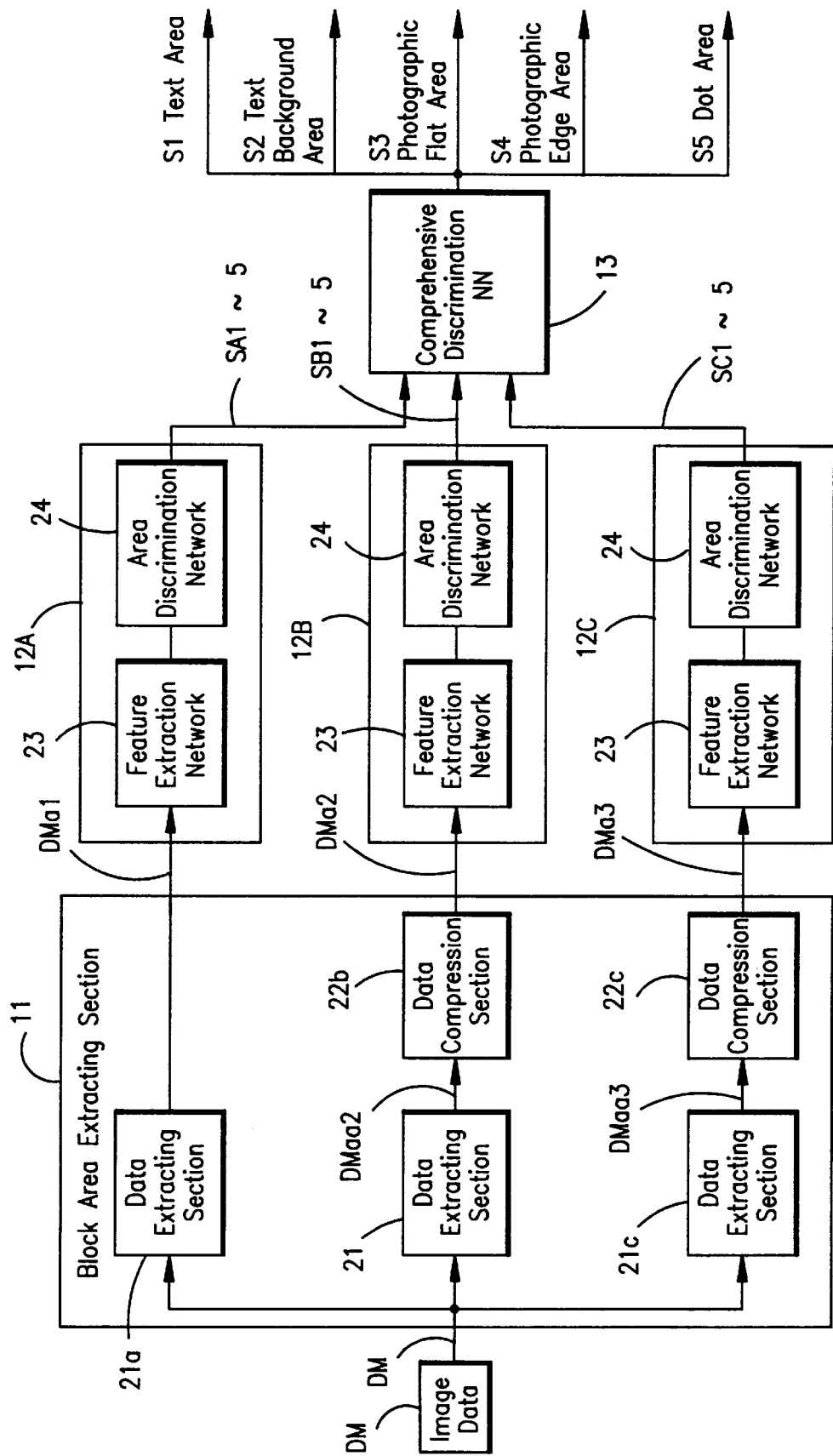
FIG. 12 is a block diagram showing the construction of an attribute discriminating device of a third embodiment of the invention.
Figure 13:
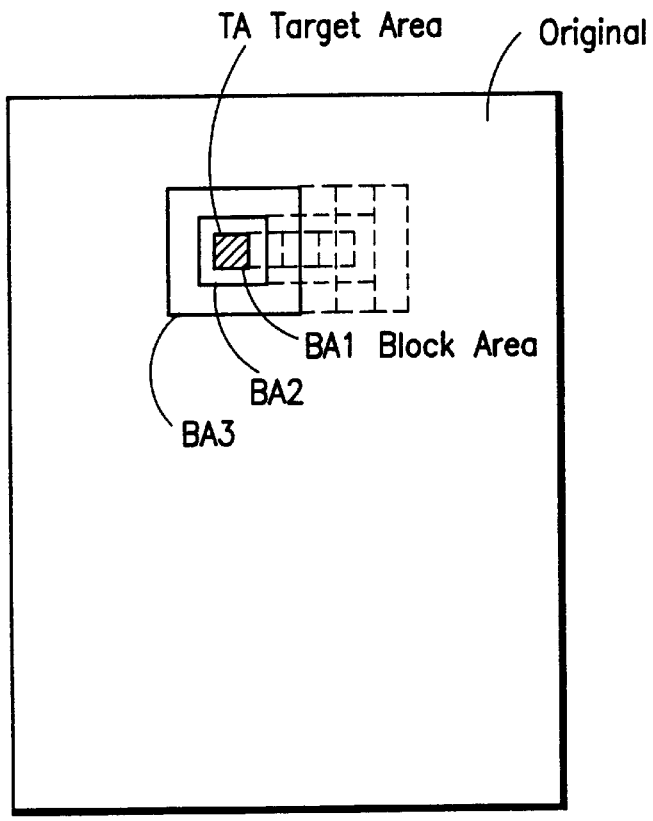
FIG. 13 shows the relationship between the target area and the block area.
Figure 14:
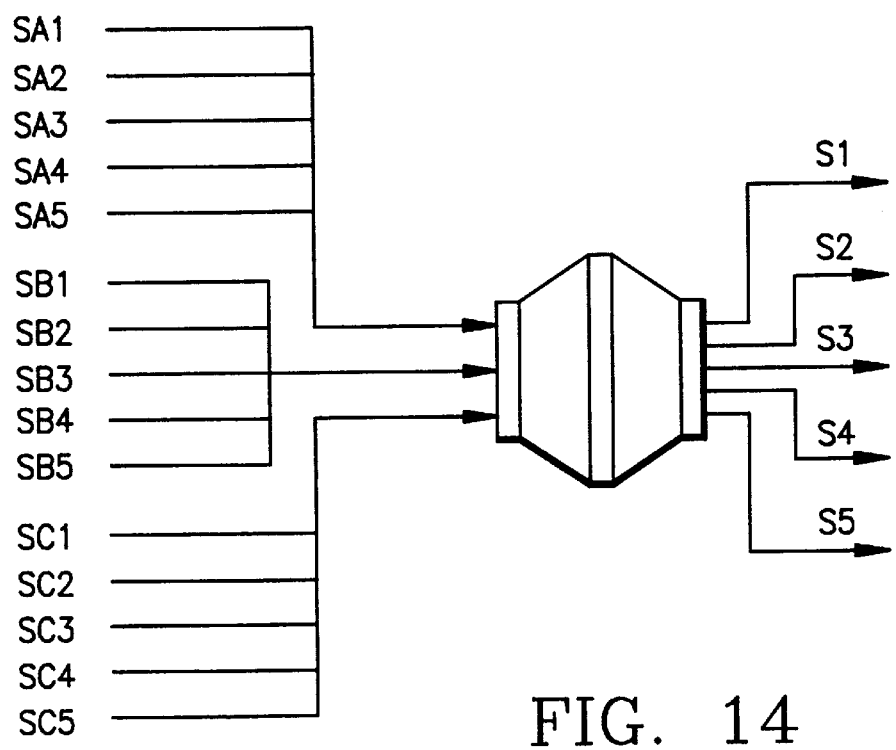
FIG. 14 shows the construction of a comprehensive discrimination neural network.

FIG. 12 is a block diagram showing the construction of the attribute discriminating device of the third embodiment; FIG. 13 is an illustration showing the relationship between the document target area TA and the block areas BA1~3; FIG. 14 illustrates the construction of the comprehensive discrimination neural network 13.

The attribute discriminating device discriminates attributes AT of a target area TA contained in the document image PM. Target area TA is, for example, an 8×8 pixel square shaped area, and each target area TA of document image PM is allocated so as to prevent mutual overlap.

As shown in FIG. 12, the attribute discriminating device comprises a block area extracting section 11, a block discrimination neural network 12 (12A, 12B, 12C), and a comprehensive discrimination neural network 13.

The block area extracting section 11 extracts, image data DMa (DMa1, DMa2, DMa3) corresponding to a plurality of block areas BA (BA1, BA2, BA3) of mutually dissimilar sizes from the input image data DM of a target area TA to be discriminated for attributes AT of document image PM. The block area extracting section 11 comprises a data extracting section 21 (21a, 21b, 21c), and a data compression section 22 (22b, 22c).

The data extracting section 21a extracts image data DMa1 of block area BA1 which is the same size as and the same position as, a single target area TA. The data extracting section 21b extracts image data DMaa2 of a block area BA2 which is double the size of the target area TA in vertical and horizontal directions. The data extracting section 21c extracts image data DMaa3 of a block area BA3 which is quadruple the size of the target area TA in vertical and horizontal directions. That is, the block areas BA1, BA2, and BA3 subjected to extraction by each data extracting section 21 have vertical/horizontal size ratios of 1:2:4, and surface area ratios of 1:4:16. When a target area TA is an 8×8 pixel area, block areas BA1, BA2, and BA3 are 8×8 pixels, 16×16 pixels, and 32×32 pixels, respectively. Accordingly, the data quantity ratios of image data DMa1, DMaa2, and DMaa3 are 1:4:16.

The data compression section 22b culls image data DMaa2 extracted by the data extracting section 21b to reduce the data quantity to ¼, and designates it image data DMa2. Examples of a data culling method include culling 3 pixels from 4 pixels along the main scan direction, or culling 3 pixels from a 2×2 pixel area. The data compression section 22c culls image data DMaa3 extracted by the data extracting section 21c to reduce the data quantity to ¹⁄₁₆, and designates it DMa3. Thus, the data quantities of image data DMa1, DMa2, and DMa3 corresponding to each block area BA1~3 comprise a total of 64 (8×8) pixels.

The aforesaid data compression prevents excessive data quantity accompanying block areas which are large in size. The block discrimination neural network 12 outputs the discrimination results as to whether or not the target area attributes AT are text area, text background area, photographic flat area, photographic edge area, or dot area based on the three types of image data DMa1, DMa2, and DMa3 output from the block area extracting section 11. That is, target area attributes TA are discriminated for each size block area BA1~3, and the result is output.

Each block area discrimination neural network 12 is identical to the neural network 12 of the second embodiment. Furthermore, block discrimination neural network 12A is also created as described in the second embodiment. The other two block discrimination neural networks 12B and 12C are also created by the same method.

When image data DMa are input to the created block discrimination network 12, output SA (SA1~5), SB (SB1~5), and SC (SC1~5) corresponding to text area, text background area, photographic flat area, photographic edge area, and dot area are obtained from the five neurons r1~5 of each output level R. That is, the block discrimination neural network 12 discriminates the respective attributes AT of the target area TA based on data input to input level S of each network A1~5. The output SA1, SB1, and SC1 of neuron r1 approach [1] when the area is a text area; the output SA2, SB2, and SC2 of neuron r2 approach [1] when the area is a text background area; the output SA3, SB3, and SC3 of neuron r3 approach [1] when the area is a photographic flat area; the output SA4, SB4, and SC4 of neuron r4 approach [1] when the area is a photographic edge area; and the output SA5, SB5, and SC5 of neuron r5 approach [1] when the area is a halftone dot area.

Thus, the block discrimination neural networks 12A, 12B, and 12C discriminate the attributes AT of the target area TA for each size block area BA1~3, and output the output SA, SB, and SC.

The comprehensive discrimination neural network 13 shown in FIG. 14 determines the attributes AT of the target area TA based on the aforesaid output SA, SB, and SC from the block discrimination neural network 12. For example, when all or any two of the outputs SA, SB, SC have the same discrimination result, the results of the discrimination result in comprehensive neural network 13.

Smoothing according to morphology is accomplished based on the attributes AT of each target area TA determined as previously described so as to correct the discrimination result of each target area TA thereby, and enlarge each area to reduce discrimination errors. Thus, the document image PM is divided into the five areas of text area, text background area, photographic flat area, photographic edge area, and halftone dot area.

In the third embodiment, there are no discrimination errors of attributes AT arising from the interrelatedness of the size of the target area TA and the type of target image thereby providing accurate discrimination of attributes AT because attributes AT are discriminated based on image data DMa1~3 corresponding to the three sizes of block areas BA1~3 of a single target area TA. Therefore, when the image of a target area TA is a halftone dot image, for example, information of dot periodicity is suitably included in one of the three block areas BA1~3, thereby eliminating the concern of erroneous discrimination of the halftone dot image as a photographic image. Even in the case of large text or thick dots or lines, information related to the features of the text and halftone dots are contained in one of the block areas BA1~3, thereby providing accurate discrimination.

In the second and third embodiments, the attributes AT of each block area BA can be discriminated by inputting the 64 raw image data DMa extracted from image data DM into the neural network 12. That is, input to the neural network 12 is easily accomplished because feature quantities need not be input to the neural network 12 as input signals, and image data of a discrimination target can be input directly.

It is unnecessary to extract beforehand features which have physical meaning as in the conventional art. Thus, circuits and programs are unnecessary, which is advantageous in terms of circuit construction, processing speed, flexibility, and cost.

In the first, second, and third embodiments, the attribute AT discrimination neural network 12 and the comprehensive discrimination neural network 13 are used for learning, and the learning results allow attributes AT to be discriminated simply and accurately.

In this regard, when the neural network 12 is not used and discrimination is executed to determine whether or not an area is a halftone dot area by means of a threshold value corresponding to the feature of the spatial frequency spectrum component, a visually coarse halftone dot image will have many low frequency spectrum components, and a visually fine halftone dot image will have many high frequency spectrum components, such that discrimination of the halftone dot image cannot be accomplished simply in accordance with the quantity of spatial frequency spectrum components. Thus, much experimentation and knowhow are required to determine the threshold value, and discrimination errors are inevitable.

After learning is accomplished by the neural network 12, processing for discrimination is possible by a lookup table showing the response function, and coupling coefficients with their sum of products calculations obtained by learning and input data, thereby improving computation processing speed. Since the coupling coefficients of networks A1~5 do not change, the feature extraction network 23 can be readily created by diverting only the coupling coefficients obtained by the learning of the neural network NNA. Moreover, simplification of the calculation process provides faster calculation speed.

Accordingly, in copying apparatuses using an attribute discriminating device, document area division can be accurately accomplished, and a sharp copy image can be output by realtime processing appropriate for the area via image data DM obtained from the document.

Although an 8×8 pixel square-shaped area is used as the target area TA in the third embodiment, various sized areas, e.g., 4×4 pixels, 3×3 pixels, 2×2 pixels, 16×16 pixels, 64×64 pixels, may be used as block area BA. Furthermore, the shape of the block areas need not be square. Although the target area TA and the block area BA1 are of identical size in the third embodiment, the size of block area BA1 may be larger than the size of the target area TA. Although the size of block areas BA2 and BA3 are double and quadruple that of the target area TA, other sizes are possible, e.g., 1.5 times, 3 times, and 9 times the size of the target area TA.

In the third embodiment, memory is used effectively, processing simplified, and processing speed improved because identical data quantities of image data DMa1~3 are provided by data compression sections 22b and 22c. It is to be understood, however, that the data quantities of image data DMa1~3 need not be identical.

Although the data quantity of image data DMa1 extracted by the data extraction section 21a is not reduced in the above embodiment, the data quantity may be reduced by the data compression section 22. In the aforesaid embodiment, the data quantity is reduced by culling image data DMaa2 and DMaa3 by data compression sections 22b and 22c, but data quantity reduction alternatively may be accomplished by determining the mean density value, maximum density value, minimum density value, and intermediate density value of a plurality of image data corresponding to a small area among image data DMaa2 and DMaa3, and representing the small area by the obtained values to reduce the data quantity.

In this case, compression may be accomplished by, for example, the four methods (1)~(4) below:

(1) Small areas may be extracted from block areas BA of each size;

(2) Mean density values may be determined from image data of each extracted small area;

(3) New small areas may be created using the determined mean density values (or maximum density value, minimum density value, intermediate density value) as representative values; and (4) New block areas may be created from the newly created small areas.

In the previously described embodiments, calculation speed is improved because information processing is accomplished to achieve discrimination by checking a lookup table listing response functions, and coupling coefficients and their sum of products calculations obtained by learning and input data when the previously described block discrimination neural network and comprehensive discrimination neural network are used for learning.

Since the coupling coefficients of the feature extraction sensors can be diverted directly from the first neural network coupling coefficient after learning, the feature extraction sensor may be simple in construction, and the calculation speed can be improved by simplifying the calculation process.

In the second and third embodiments, five types of attributes are discriminated, i.e., text area, text background area, photographic flat area, photographic edge area, and halftone dot area, but alternatively, attributes of four types or less, or six types or more may be used.

In the first, second, and third embodiments, the block area extracting section 11, the Fourier transform section 14, and the statistics computing section 15 are realized in software by a memory which stores programs and data, and a CPU which executes the programs. The neural network 12 is realized by a simulator via computer. Accordingly, the neural network 12 may be realized by a lookup table listing learned coupling coefficients and response functions, and programs to compute and retrieve the coupling coefficients and response functions, as previously described. Such forms are also contained in the neural networks of the present invention. The neural networks may also be realized directly in hardware.

Although five levels are used in the neural networks NNA in the second and third embodiments, four levels or fewer, or six levels or more alternatively may be used. While five individual networks A1~5 are used in the aforesaid embodiments, four networks or fewer, or six networks or more, also may be used. The area discriminating network 24 uses three levels in the above embodiments, but four levels, five levels, or more are also possible. Although a single area discrimination network 24 is coupled to five networks A1~5, separate area discrimination networks may be coupled to each network A1~5.

In each of the previously described embodiments, the number of neurons of each level, use of coupling coefficients, type of response functions, and learning methods may be variously changed. In addition, the construction of each part or the entirety of the attribute discriminating device, process content, process sequence and the like may be variously modified in conformance with the scope of the invention.

The present invention may be adapted for discrimination of various attributes AT other than areas. The present invention also may be adapted to various types of information processing such as image recognition, voice recognition, voice synthesis, automated translation and the like. In such applications, feature extraction itself is accomplished by the neural network 12, making it unnecessary to consider what should be designated a feature, and making it unnecessary to create circuits and programs for extracting features. The neural network 12 is easily created because the feature extraction network 23 is created by the learning of neural network NNA.

Although the present invention has been fully described by way of examples with reference to the accompanying drawings, it is to be noted that various changes and modification will be apparent to those skilled in the art. Therefore, unless such changes and modifications depart from the scope of the present invention, they should be construed as being included therein.

What is claimed is:

1. A device for discriminating whether an image in a block area contained in a document image is a halftone dot image, the device comprising:

means for performing a Fourier transformation based on image data in the block area and determining a spatial frequency spectrum relating to the image in the block area; and a neural network which produces a discrimination result indicating whether or not the image in the block area is a halftone dot image based on the determined spatial frequency spectrum.

2. A device for classifying an image in a block area contained in a document image, the device comprising:

means for calculating a quantity of a feature based on image data in the block area; and a neural network which produces a discrimination result indicating whether or not the image in the block area is a text image, or a photographic image, or a halftone dot image based on the calculated quantity of the feature.

3. The device as claimed in claim 2, wherein the means for calculating includes:

means for performing Fourier transformation based on image data in the block area and determining a spatial frequency spectrum therefrom; and means for creating a density matrix based on image data in the block area and determining statistics which describe the density distribution in the block area.

4. A device for classifying an image in a block area contained in a document image, the device comprising:

means for creating a density matrix based on image data in the block area and determining statistics which describe density distribution; and a neural network which produces a discrimination result indicating whether or not the image in the block area is a text image or a photographic image based on the determined statistics.

5. A neural network for discriminating an attribute of an image based on input image data, comprising:

a first neural network for calculating a quantity of a feature of the image, said first neural network including an input level, an intermediate level and an output level which are trained so that said quantity is calculated at said intermediate level and output values produced at said output level are the same as image values input to said input level; and a second neural network connected to said intermediate level of said first neural network for outputting an attribute of the image based on the calculated quantity of the feature.

6. The device as claimed in claim 5, further comprising:

means for dividing an image into a plurality of blocks; and means for inputting image data of the divided blocks, so that an attribute of an image in each block is discriminated.

7. The device as claimed in claim 5, wherein the discriminated attribute is one of a text image, a photographic image, and a halftone dot image.

8. The device as claimed in claim 6, wherein the discriminated attribute is one of a text image, a photographic image, and a halftone dot image.

9. The neural network of claim 5, wherein the image values input to said input level comprise pixel values which respectively describe individual pixels in said image.

10. An attribute discriminating device, comprising:

means for outputting image data of a plurality of blocks having mutually different sizes relative to a target area for which an attribute is to be discriminated within a document image; and a neural network for discriminating an attribute of the target area based on the image data corresponding to the plurality of blocks.

11. The attribute discriminating device as claimed in claim 10, wherein the neural network includes:

a first neural network for discriminating an attribute of an image in each block based on the corresponding image data from the means for outputting; and a second neural network for discriminating an attribute of an image in the target area synthetically based on results discriminated by the first neural network.

12. The attribute discriminating device as claimed in claim 11, wherein the means for outputting includes means for compressing image data in the plurality of blocks so as to reduce an amount of image data.

13. The attribute discriminating device as claimed in claim 12, wherein the means for compressing compresses image data in each block so that an amount of the compressed image data is a certain amount.

14. An attribute discriminating device, comprising:

means for outputting image data in a plurality of blocks having mutually different sizes relative to a target area for which attributes are to be discriminated within a document image;

first means for discriminating an attribute of an image in each block based on the corresponding image data from the means for outputting; and second means for discriminating an attribute of an image synthetically based on results discriminated by the first means for discriminating.

15. The attribute discriminating device as claimed in claim 14, wherein the second means discriminates an attribute of an image in the target area.

16. The attribute discriminating device as claimed in claim 14, wherein the first means and the second means are constructed by a neural network.

* * * * *